Nov. 28, 1933.      C. L. HOWSE      1,936,907
APPARATUS FOR TESTING WATER LEVELS
Filed March 31, 1930
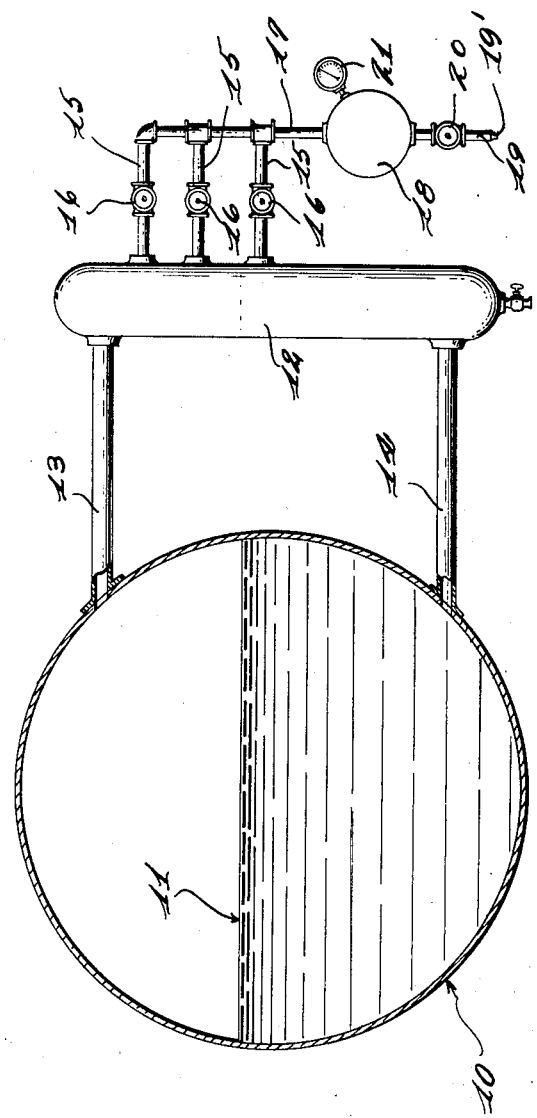
INVENTOR
Curtis L. Howse
BY Whittemore Hulbert
Whittemore & Belknap
ATTORNEYS Patented Nov. 28, 1933

1,936,907

UNITED STATES PATENT OFFICE 1,936,907

APPARATUS FOR TESTING WATER LEVELS

Curtis L. Howse, Detroit, Mich., assignor to Diamond Power Specialty Corporation, Detroit, Mich., a corporation of Michigan Application March 31, 1930. Serial No. 440,526

14 Claims. (Cl. 73—54)

This invention relates to an apparatus for testing water levels and has particular reference to an apparatus for determining the level of the water in a boiler or the like.

One of the primary objects of this invention is to provide an apparatus by which the level of the water in a boiler may be accurately determined regardless of the pressure at which the boiler is operated.

A further object of this invention is to provide an apparatus of the above-mentioned character which is simple in construction and, therefore, capable of economical manufacture on a commercial scale and which may readily be utilized by unskilled labor.

Other objects and advantages of this invention will become more apparent as the following description proceeds.

Heretofore it has been customary to provide a plurality of try-cocks on the water column of a boiler for testing the water level in the boiler. These try-cocks comprise a series of valves installed one above the other, which valves can be successively opened to discharge the fluid from the boiler at spaced levels. Observation is then made as to whether water or steam escapes from the boiler to determine the level of the water within the boiler.

These test-cocks which have heretofore been used for testing the water level in a boiler are not adapted for the testing of the water level in a high pressure boiler because at high pressures the water flashes into steam when released from the test-cock and the operator is unable to tell whether he is releasing water or steam from the boiler upon the opening of any of the valves. The present invention contemplates the provision of an apparatus which will function efficiently to advise the operator of the level of the water in a boiler regardless of the pressure at which the boiler is operated and thus contemplates the provision of an apparatus in which the disadvantages of the old test-cock system are eliminated.

Broadly, the apparatus provides means for tapping the boiler at a plurality of spaced levels to draw a fluid from the boiler at each level. There is further provided means for trapping the fluid drawn from the boiler at each level and means for indicating whether water or steam is trapped at each level. The apparatus is shown in the single semi-diagrammatic figure of the accompanying drawing.

Referring then particularly to the drawing the reference character 10 designates a boiler drum, the normal water level therein being indicated by the reference character 11. A water column 12 communicates with the boiler drum above and below the normal water level therein as by the conduits 13 and 14.

Connecting into the water column at a plurality of spaced levels are conduits 15. Each of these conduits is provided with a valve or try-cock 16 and each conduit discharges into a header 17 which communicates with a metering or expansion chamber 18. The expansion chamber is provided with a discharge conduit 19 controlled by a valve 20 and is further provided with a pressure gauge 21 arranged to indicate the pressure within the chamber. The discharge conduit terminates in a restricted discharge orifice 19'.

With the apparatus above described several methods may be utilized for determining the level of the water in the boiler drum 10. Thus the valve 20 may be left in open position and the try-cocks 16 may be successively opened, one at a time. As each try-cock is opened fluid will flow from the boiler at the level of the conduit with which the try-cock is associated and will be discharged into the chamber 18. The gauge on this chamber will show the pressure within the same and will show a higher pressure if water is discharged into the chamber than if steam is discharged therein. Thus, the gauge will indicate whether water or steam is discharged into the chamber 18 upon the opening of any one of the testcocks and the level of the water in the boiler may be determined by reading the gauge as each try-cock is opened. The size of the opening in each valve 16 and its accompanying conduit 15 may be so proportioned with respect to the size of the opening in valve 20 and its accompanying conduit 19 as to produce the maximum pressure differential on the gauge 21 for the different conditions of steam or water flow through said valve 16 and conduit 15. The ratio in the size of these openings may be conveniently varied in accordance with the pressure in the boiler drum to produce this desired pressure effect in the chamber 18 as registered by the gauge 21.

A second method which may be utilized in conjunction with the above-described apparatus consists in first closing valve 20 and then opening one of the valves 16 to fill the chamber 18 with a fluid drawn from the boiler drum. The valve 16 is then closed and the valve 20 is opened to permit a discharge of the fluid from the chamber 18 through conduit 19. If the metering chamber is filled with steam a more rapid blow-down will result than if the chamber is filled with water so that by following this procedure for each valve 16, the level of the water in the boiler drum may be accurately determined.

From the above it will be apparent that the invention provides an apparatus by which a boiler drum may be tapped at a plurality of spaced levels. The invention further provides for trapping the fluid drawn from the boiler at each level and for indicating whether water or steam is drawn from the boiler at each level either by pressure responsive means such as the gauge 21 or by suitable discharge means such as the conduit 19 and valve 20. The fluid drawn from the boiler drum is limited in its expansion in the chamber 18 and will not, therefore, flash into steam as results if the try-cocks are opened directly to the atmosphere, and the invention therefore provides for the testing of the water level in a boiler regardless of the pressure at which the boiler is operated.

While the invention has been described with considerable detail it is to be understood that the description is illustrative only and is not definitive of the limits of the inventive idea. The right is therefor reserved to make such changes in the details of construction and arrangement of parts as will fall within the purview of the attached claims.

What is claimed is:

1. An apparatus for determining the level of water in a high pressure boiler including in combination, means for tapping said boiler at any one of a plurality of spaced levels, and means including a chamber communicating with said tapping means providing a relatively low pressure zone for distinguishing between the discharge of steam and water at each of said levels.

2. An apparatus for determining the level of water in a boiler including in combination a chamber providing a relatively low pressure zone, means for placing said chamber in communication with said boiler at any one of a plurality of spaced levels, and a pressure indicator communicating with said chamber for determining whether water or steam is discharged into said chamber from said boiler at each of said levels.

3. An apparatus for determining the level of water in a boiler including in combination, means for tapping said boiler at a plurality of spaced levels, a chamber providing a relatively low pressure zone for receiving the fluid discharged from said boiler at each of said levels, an outlet conduit for said chamber, and a valve controlling said outlet conduit.

4. An apparatus for determining the level of water in a boiler including in combination, means for tapping said boiler at each of a plurality of spaced levels, a chamber providing a relatively low pressure zone for receiving the fluid discharged at each level, a pressure gauge, and means communicating said pressure gauge with said chamber for indicating the pressure therein.

5. An apparatus for determining the level of water in a boiler including in combination, a plurality of conduits communicating with said boiler at a plurality of spaced levels, valves controlling the passage of fluid from said boiler through said conduits, a chamber providing a relatively low pressure zone for receiving the fluid drawn from said boiler through said conduits, a discharge conduit for said chamber, a pressure gauge, and means connecting said pressure gauge to said chamber.

6. An apparatus for determining the level of water in a boiler including in combination means providing a restricted zone differing in pressure from the pressure in the boiler, means for placing said restricted zone in communication with said boiler at any one of a plurality of spaced levels, to permit the discharge of fluid from the boiler into said zone, and means to determine the character of the fluid in said restricted zone.

7. An apparatus for determining the level of water in a boiler including in combination a conduit communicating with said boiler at a predetermined level, a valve controlling the flow of fluid from said boiler through said conduit, means providing for a limited expansion of the fluid discharged from said conduit in a zone of lower pressure than said boiler, and means to determine the degree of said expansion.

8. An apparatus for determining the level of water in a high pressure boiler including in combination a chamber providing a restricted zone of relatively low pressure, conduits connecting said chamber with said boiler at a plurality of spaced levels in the boiler, said conduits providing passages between said boiler and said chamber of such cross sectional area that a substantial drop in the pressure of the fluid will result upon flow of the fluid through said conduits to said chamber, and a valve associated with each conduit for controlling the flow of fluid through the same.

9. In an apparatus of the class described, an expansion chamber, means providing a restricted discharge from said chamber, means for indicating the pressure within said chamber, and means for placing said chamber in communication with a boiler at any one of a plurality of spaced levels therein.

10. An apparatus for determining the level of water in a boiler including in combination, means for tapping said boiler at a plurality of spaced levels, a chamber providing a restricted zone for receiving the fluid discharged from said boiler at any one of said levels, an outlet conduit for said chamber, and a valve controlling said outlet.

11. In an apparatus for determining the level of water in a boiler, a chamber providing a restricted zone, a plurality of valved controlled conduits establishing communication between said chamber and the boiler at a plurality of spaced levels whereby a predetermined limited quantity of fluid may be withdrawn from said boiler into said chamber at any one of said levels, an outlet conduit for said chamber, and a valve controlling said outlet.

12. In an apparatus for determining the level of water in a boiler, a chamber providing a restricted zone, means providing for the withdrawal of a predetermined limited quantity of fluid into said chamber from said boiler at any one of a plurality of spaced levels, and means controlling the discharge of said predetermined limited quantity of fluid from said chamber.

13. In an apparatus for determining the level of water in a boiler, a chamber providing a restricted zone, means connecting said chamber to said boiler at a plurality of spaced levels comprising a plurality of conduits, a valve in each of said conduits controlling communication between said chamber and the boiler operable to permit the withdrawal of a predetermined limited quantity of fluid from said boiler into said chamber and to close communication between said chamber and the boiler, a discharge conduit from said chamber leading to atmosphere, and a valve in said discharge conduit controlling communication between said conduit and atmosphere.

14. In an apparatus for determining the level of water in a boiler, a chambered vessel, means providing for the withdrawal into said vessel of a predetermined limited quantity of fluid from said boiler at any one of a plurality of spaced levels, and means including a pair of valves to confine within said vessel said predetermined limited quantity of fluid, one of said valves controlling the discharge of said fluid from said vessel to atmosphere.

CURTIS L. HOWSE.